United States Patent [19]

Cherpeck

[11] Patent Number: 5,413,615
[45] Date of Patent: May 9, 1995

[54] POLYALKYL HYDROXY AND AMINO AROMATIC CARBAMATES AND FUEL COMPOSITIONS CONTAINING THE SAME

[75] Inventor: Richard E. Cherpeck, Cotati, Calif.

[73] Assignee: Chevron Chemical Company, San Ramon, Calif.

[21] Appl. No.: 236,434

[22] Filed: May 2, 1994

[51] Int. Cl.$^6$ .................................................. C10L 1/18
[52] U.S. Cl. .................................... 44/387; 44/408; 44/418; 44/426; 44/428; 560/24; 560/132
[58] Field of Search ............... 44/387, 408, 418, 426, 44/428, 325; 560/24, 132

[56] References Cited

U.S. PATENT DOCUMENTS

| | | | |
|---|---|---|---|
| 3,285,855 | 11/1966 | Dexter et al. | 252/57 |
| 3,849,085 | 11/1974 | Kreuz et al. | 44/78 |
| 3,933,470 | 1/1976 | Cross et al. | 71/111 |
| 4,134,846 | 1/1979 | Machleder et al. | 252/51.5 A |
| 4,231,759 | 11/1980 | Udelhofen et al. | 44/75 |
| 4,320,021 | 3/1982 | Lange | 252/51.5 R |
| 4,347,148 | 8/1982 | Davis | 252/51.5 R |
| 4,550,188 | 10/1985 | Frulla et al. | 560/24 |
| 4,748,265 | 5/1988 | Oxbol et al. | 560/25 |
| 4,859,210 | 8/1989 | Franz et al. | 44/53 |
| 5,196,142 | 3/1993 | Mollet et al. | 252/311 |
| 5,246,912 | 9/1993 | Nielsen | 504/135 |

Primary Examiner—Prince Willis, Jr.
Assistant Examiner—Cephia D. Toomer
Attorney, Agent, or Firm—C. J. Caroli

[57] ABSTRACT

Polyalkyl hydroxy and amino aromatic carbamates having the formula:

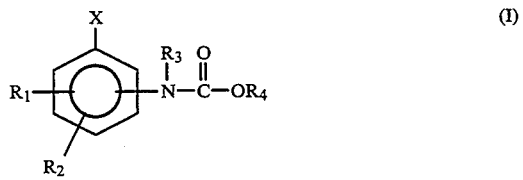

or a fuel-soluble salt thereof; wherein
X is hydroxy or amino;
$R_1$ and $R_2$ are independently hydrogen, hydroxy, lower alkyl having 1 to 6 carbon atoms, lower alkoxy having 1 to 6 carbon atoms, nitro, amino, N-alkylamino wherein the alkyl group contains 1 to 6 carbon atoms, or N,N-dialkylamino wherein each alkyl group independently contains 1 to 6 carbon atoms;
$R_3$ is hydrogen or lower alkyl having 1 to 6 carbon atoms; and
$R_4$ is a polyalkyl group having an average molecular weight in the range of about 400 to 5,000.

The polyalkyl hydroxy and amino aromatic carbamates of formula I are useful as fuel additives for the prevention and control of engine deposits.

37 Claims, No Drawings

POLYALKYL HYDROXY AND AMINO AROMATIC CARBAMATES AND FUEL COMPOSITIONS CONTAINING THE SAME

BACKGROUND OF THE INVENTION

1. Field of the Invention

This invention relates to novel hydroxy and amino aromatic compounds. More particularly, this invention relates to novel polyalkyl hydroxy and amino aromatic carbamates and their use in fuel compositions to prevent and control engine deposits.

2. Description of the Related Art

It is well known that automobile engines tend to form deposits on the surface of engine components, such as carburetor ports, throttle bodies, fuel injectors, intake ports and intake valves, due to the oxidation and polymerization of hydrocarbon fuel. These deposits, even when present in relatively minor amounts, often cause noticeable driveability problems, such as stalling and poor acceleration. Moreover, engine deposits can significantly increase an automobile's fuel consumption and production of exhaust pollutants. Therefore, the development of effective fuel detergents or "deposit control" additives to prevent or control such deposits is of considerable importance and numerous such materials are known in the art.

For example, aliphatic hydrocarbon-substituted phenols are known to reduce engine deposits when used in fuel compositions. U.S. Pat. No. 3,849,085, issued Nov. 19, 1974 to Kreuz et al., discloses a motor fuel composition comprising a mixture of hydrocarbons in the gasoline boiling range containing about 0.01 to 0.25 volume percent of a high molecular weight aliphatic hydrocarbon-substituted phenol in which the aliphatic hydrocarbon radical has an average molecular weight in the range of about 500 to 3,500. This patent teaches that gasoline compositions containing minor amounts of an aliphatic hydrocarbon-substituted phenol not only prevent or inhibit the formation of intake valve and port deposits in a gasoline engine, but also enhance the performance of the fuel composition in engines designed to operate at higher 3.3. operating temperatures with a minimum of decomposition and deposit formation in the manifold of the engine.

Similarly, U.S. Pat. No. 4,134,846, issued Jan. 16, 1979 to Machleder et al., discloses a fuel additive composition comprising a mixture of (1) the reaction product of an aliphatic hydrocarbon-substituted phenol, epichlorohydrin and a primary or secondary mono- or polyamine, and (2) a polyalkylene phenol. This patent teaches that such compositions show excellent carburetor, induction system and combustion chamber detergency and, in addition, provide effective rust inhibition when used in hydrocarbon fuels at low concentrations.

Amino phenols are also known to function as detergents/dispersants, antioxidants and anti-corrosion agents when used in fuel compositions. U.S. Pat. No. 4,320,021, issued Mar. 16, 1982 to R. M. Lange, for example, discloses amino phenols having at least one substantially saturated hydrocarbon-based substituent of at least 30 carbon atoms. The amino phenols of this patent are taught to impart useful and desirable properties to oil-based lubricants and normally liquid fuels.

Nitro phenols have also been employed as fuel additives. For example, U.S. Pat. No. 4,347,148, issued Aug. 31, 1982 to K. E. Davis, discloses nitro phenols containing at least one aliphatic substituent having at least about 40 carbon atoms. The nitro phenols of this patent are taught to be useful as detergents, dispersants, antioxidants and demulsifiers for lubricating oil and fuel compositions.

In addition, U.S. Pat. No. 4,231,759, issued Nov. 4, 1980 to Udelhofen et al., discloses a fuel additive composition comprising the Mannich condensation product of (1) a high molecular weight alkyl-substituted hydroxyaromatic compound wherein the alkyl group has a number average molecular weight of about 600 to about 3,000, (2) an amine and (3) an aldehyde. This patent teaches that such Mannich condensation products provide carburetor cleanliness when employed alone, and intake valve cleanliness when employed in combination with a hydrocarbon carrier fluid.

U.S. Pat. No. 4,859,210, issued Aug. 22, 1989 to Franz et al., discloses fuel compositions containing (1) one or more polybutyl or polyisobutyl alcohols wherein the polybutyl or polyisobutyl group has a number average molecular weight of 324 to 3,000, or (2) a poly(alkoxylate) of the polybutyl or polyisobutyl alcohol, or (3) a carboxylate ester of the polybutyl or polyisobutyl alcohol. This patent further teaches that when the fuel composition contains an ester of a polybutyl or polyisobutyl alcohol, the ester-forming acid group may be derived from saturated or unsaturated, aliphatic or aromatic, acyclic or cyclic mono- or polycarboxylic acids.

U.S. Pat. No. 3,285,855, issued Nov. 15, 1966 to Dexter et al., discloses alkyl esters of dialkyl hydroxybenzoic and hydroxyphenylalkanoic acids wherein the ester moiety contains from 6 to 30 carbon atoms. This patent teaches that such esters are useful for stabilizing polypropylene and other organic material normally subject to oxidative deterioration. Similar alkyl esters containing hindered dialkyl hydroxyphenyl groups are disclosed in U.S. Pat. No. 5,196,565, which issued Mar. 23, 1993 to Ross.

U.S. Pat. No. 5,196,142, issued Mar. 23, 1993 to Mollet et al., discloses alkyl esters of hydroxyphenyl carboxylic acids wherein the ester moiety may contain up to 23 carbon atoms. This patent teaches that such compounds are useful as antioxidants for stabilizing emulsion-polymerized polymers.

U.S. Pat. No. 3,933,470, issued Jan. 20, 1976 to Cross et al., discloses esters of hydroxycarbanilic acid, wherein the ester moiety is straight or branched alkyl of 1 to 10 carbon atoms, cycloalkyl, benzyl, chlorobenzyl, methylbenzyl, phenyl, chlorophenyl, methylphenyl, alkenyl of 2 to 6 carbon atoms, monohaloalkenyl, alkynyl of 2 to 6 carbon atoms, monohaloalkynyl, and monomethoxyalkynyl. This patent teaches such hydroxycarbanilic acid esters as intermediates in the preparation of alkynyloxy, alkenyloxy and cyanoalkoxy carbanilic acid esters, which are useful as herbicides for controlling broadleaf weeds and grasses.

It has now been discovered that certain polyalkyl hydroxy and amino aromatic carbamates provide excellent control of engine deposits, especially intake valve deposits, when employed as fuel additives in fuel compositions.

SUMMARY OF THE INVENTION

The present invention provides novel polyalkyl hydroxy and amino aromatic carbamates which are useful as fuel additives for the prevention and control of engine deposits, particularly intake valve deposits.

The polyalkyl hydroxy and amino aromatic carbamates of the present invention are compounds having the formula:

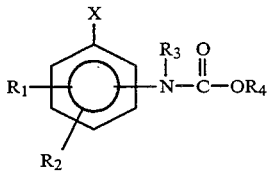

or a fuel-soluble salt thereof; wherein X is hydroxy or amino; $R_1$ and $R_2$ are independently hydrogen, hydroxy, lower alkyl having 1 to 6 carbon atoms, lower alkoxy having 1 to 6 carbon atoms, nitro, amino, N-alkylamino wherein the alkyl group contains 1 to 6 carbon atoms, or N,N-dialkylamino wherein each alkyl group independently contains 1 to 6 carbon atoms;

$R_3$ is hydrogen or lower alkyl having 1 to 6 carbon atoms; and $R_4$ is a polyalkyl group having an average molecular weight in the range of about 400 to 5,000.

The present invention further provides a fuel composition comprising a major amount of hydrocarbons boiling in the gasoline or diesel range and an effective deposit-controlling amount of a polyalkyl hydroxy or amino aromatic carbamate of the present invention.

The present invention additionally provides a fuel concentrate comprising an inert stable oleophilic organic solvent boiling in the range of from about 150° F. to 400° F. and from about 10 to 70 weight percent of a polyalkyl hydroxy or amino aromatic carbamate of the present invention.

Among other factors, the present invention is based on the surprising discovery that certain polyalkyl hydroxy and amino aromatic carbamates provide excellent control of engine deposits, especially on intake valves, when employed as fuel additives in fuel compositions.

DETAILED DESCRIPTION OF THE INVENTION

The fuel additives provided by the present invention have the general formula:

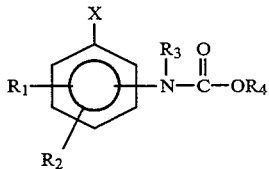

or a fuel-soluble salt thereof; wherein X, $R_1$, $R_2$, $R_3$, and $R_4$ are as defined hereinabove.

In formula I above, X can be hydroxy or amino. Preferably, X is hydroxy.

Preferably, $R_1$ and $R_2$ are independently hydrogen, hydroxy, lower alkyl of 1 to 4 carbon atoms, nitro or amino. More preferably, $R_9$ and $R_2$ are independently hydrogen, hydroxy or amino. Most preferably, $R_1$ and $R_2$ are independently hydrogen or amino.

$R_3$ is preferably hydrogen or lower alkyl of 1 to 4 carbon atoms. More preferably, $R_3$ is hydrogen, methyl or ethyl. Preferably, $R_4$ is a polyalkyl group having an average molecular weight in the range of about 500 to 3,000, more preferably about 600 to 2,000.

When $R_1$ or $R_2$ is an N-alkylamino group, the alkyl group of the N-alkylamino moiety preferably contains 1 to 4 carbon atoms. More preferably, the alkyl group is methyl or ethyl. For example, particularly preferred N-alkylamino groups are N-methylamino and N-ethylamino groups.

Similarly, when $R_1$ or $R_2$ is an N,N-dialkylamino group, each alkyl group of the N,N-dialkylamino moiety preferably contains 1 to 4 carbon atoms. More preferably, each alkyl group is either methyl or ethyl. For example, particularly preferred N,N-dialkylamino groups are N,N-dimethylamino, N-ethyl-N-methylamino and N,N-diethylamino groups.

A preferred group of polyalkyl aromatic carbamates are those of formula I wherein X is hydroxy; $R_1$ is hydrogen, hydroxy, lower alkyl of 1 to 4 carbon atoms, nitro or amino; $R_2$ is hydrogen or amino; and $R_3$ is hydrogen.

A more preferred group of polyalkyl aromatic carbamates are those of formula I wherein X is hydroxy; $R_1$ is hydrogen, hydroxy or amino; and $R_2$ and $R_3$ are hydrogen. Even more preferably, $R_1$ is amino and $R_2$ and $R_3$ are hydrogen.

A further preferred group of polyalkyl aromatic carbamates are those of formula I wherein X is hydroxy; $R_1$ and $R_2$ are amino; and $R_3$ is hydrogen.

It is especially preferred that the aromatic hydroxyl or amino group present in the polyalkyl aromatic carbamates of this invention be situated in a meta or para position relative to the polyalkyl carbamate moiety. When the aromatic moiety contains an additional hydroxy, nitro, amino, alkylamino or dialkylamino group, it is particularly preferred that the hydroxyl or amino group be in a meta or para position relative to the polyalkyl carbamate moiety, and in an ortho position relative to the additional hydroxy, nitro, amino, alkylamino or dialkylamino group.

The polyalkyl hydroxy and amino aromatic carbamates of the present invention will generally have a sufficient molecular weight so as to be non-volatile at normal engine intake valve operating temperatures (about 200°-250° C.). Typically, the molecular weight of the polyalkyl hydroxy and amino aromatic carbamates of this invention will range from about 600 to about 5,000, preferably from 600 to 3,000, more preferably from 700 to 2,000.

Fuel-soluble salts of the polyalkyl hydroxy and amino aromatic carbamates of the present invention are also contemplated to be useful for preventing or controlling deposits. For those compounds containing a hydroxy group, such salts include alkali metal, alkaline earth metal, ammonium, substituted ammonium and sulfonium salts.

Preferred metal salts are the alkali metal salts, particularly the sodium and potassium salts, and the substituted ammonium salts, particularly tetraalkyl-substituted ammonium salts, such as the tetrabutylammonium salts.

Fuel-soluble salts of the polyalkyl aromatic carbamates of the present invention can also be readily prepared for those compounds containing an amino, N-alkylamino or N,N-dialkylamino group. Suitable salts include, for example, those obtained by protonating the amino moiety with a strong organic acid, such as an alkyl- or arylsulfonic acid. Preferred salts are derived from toluenesulfonic acid and methanesulfonic acid.

Definitions

As used herein, the following terms have the following meanings unless expressly stated to the contrary.

The term "amino" refers to the group: —NH$_2$.

The term "N-alkylamino" refers to the group: —NHR$_a$ wherein R$_a$ is an alkyl group. The term "N,N-dialkylamino" refers to the group: —NR$_b$R$_c$, wherein R$_b$ and R$_c$ are alkyl groups.

The term "alkyl" refers to both straight- and branched-chain alkyl groups.

The term "lower alkyl" refers to alkyl groups having 1 to about 6 carbon atoms and includes primary, secondary and tertiary alkyl groups. Typical lower alkyl groups include, for example, methyl, ethyl, n-propyl, isopropyl, n-butyl, sec-butyl, t-butyl, n-pentyl, n-hexyl and the like.

The term "lower alkoxy" refers to the group —OR$_d$ wherein R$_d$ is lower alkyl. Typical lower alkoxy groups include methoxy, ethoxy, and the like.

The term "polyalkyl" refers to alkyl groups which are generally derived from polyolefins which are polymers or copolymers of mono-olefins, particularly 1-mono-olefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, especially polyisobutene, and the polyalphaolefins produced from 1-octene and 1-decene.

General Synthetic Procedures

The polyalkyl hydroxy and amino aromatic carbamates of this invention may be prepared by the following general methods and procedures. It should be appreciated that where typical or preferred process conditions (e.g., reaction temperatures, times, mole ratios of reactants, solvents, pressures, etc.) are given, other process conditions may also be used unless otherwise stated. Optimum reaction conditions may vary with the particular reactants or solvents used, but such conditions can be determined by one skilled in the art by routine optimization procedures.

Moreover, those skilled in the art will recognize that it may be necessary to block or protect certain functional groups while conducting the following synthetic procedures. In such cases, the protecting group will serve to protect the functional group from undesired reactions or to block its undesired reaction with other functional groups or with the reagents used to carry out the desired chemical transformations. The proper choice of a protecting group for a particular functional group will be readily apparent to one skilled in the art. Various protecting groups and their introduction and removal are described, for example, in T. W. Greene and P. G. M. Wuts, *Protective Groups in Organic Synthesis*, Second Edition, Wiley, New York, 1991, and references cited therein.

In the present synthetic procedures, a hydroxyl group will preferably be protected, when necessary, as the benzyl or tert-butyldimethylsilyl ether. Introduction and removal of these protecting groups is well described in the art. Amino groups may also require protection and this may be accomplished by employing a standard amino protecting group, such as a benzyloxycarbonyl or a trifluoroacetyl group. Additionally, as will be discussed in further detail hereinbelow, the polyalkyl aromatic carbamates of this invention having an amino group on the aromatic moiety will generally be prepared from the corresponding nitro derivative. Accordingly, in many of the following procedures, a nitro group will serve as a protecting group for the amino moiety.

The polyalkyl hydroxy and amino aromatic carbamates of the present invention having the formula:

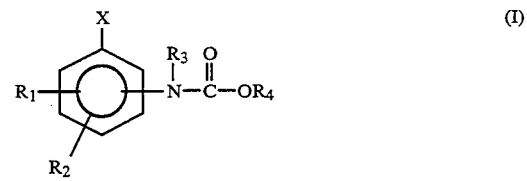

(I)

wherein X, R$_1$, R$_2$, R$_3$ and R$_4$ are as defined above, may be prepared by reacting a polyalkyl alcohol having the formula:

$$R_4\text{—OH} \quad (II)$$

wherein R$_4$ is as defined above, with phosgene, COCl$_2$, to provide a chloroformate ester having the formula:

(III)

The above reaction may be represented as follows:

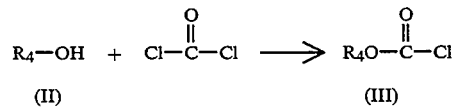

The resulting chloroformate ester of formula III is then reacted with a primary or secondary hydroxy or nitro aromatic amine having the formula:

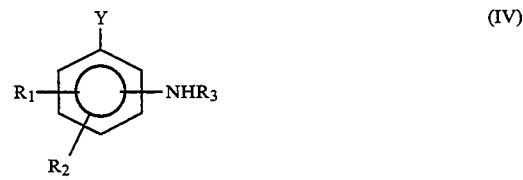

(IV)

wherein R$_1$, R$_2$ and R$_3$ are as defined above, and Y is hydroxy or nitro, to provide the polyalkyl hydroxy or nitro aromatic carbamates of formula (V). This reaction may be represented as follows:

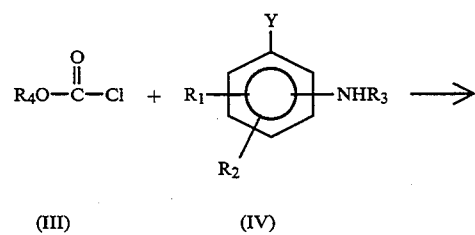

-continued

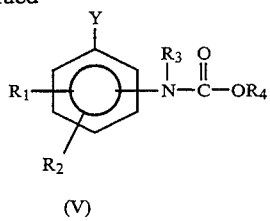

(V)

For those compounds of formula V where Y is a nitro group, reduction of the nitro group by conventional procedures will provide the desired polyalkyl amino aromatic carbamates of formula I.

The hydroxy or nitro aromatic amines of formula IV are either known compounds or can be prepared from known compounds by conventional procedures. Suitable hydroxy or nitro aromatic amines for use as starting materials in this invention include 4-aminophenol, 2-nitro-4-aminophenol, 2-nitro-5-aminophenol, 2,6-dinitro-4-aminophenol, 4-(N-methylamino)phenol, 2-nitro-4-(N-methylamino)phenol, 2-nitro-5-(N-methylamino)phenol, 2,6-dinitro-4-(N-methylamino)phenol, 2-hydroxy-4-aminophenol, 2-hydroxy-4-(N-methylamino)phenol, 2,6-dihydroxy-4-aminophenol, 2,6-dihydroxy-4-(N-methylamino)phenol, 2-t-butyl-4-aminophenol, 2-t-butyl-4-(N-methylamino)phenol, 4-nitroaniline, 3-nitroaniline, and the like.

Preferred hydroxy or nitro aromatic amines of formula IV include 4-aminophenol, 2-nitro-4-aminophenol, 2-nitro-5-aminophenol, 2,6-dinitro-4-aminophenol, 4-nitroaniline and 3-nitroaniline.

The polyalkyl alcohols of formula II may also be prepared by conventional procedures known in the art. Such procedures are taught, for example, in U.S. Pat. Nos. 5,055,607 to Buckley and 4,859,210 to Franz et al., the disclosures of which are incorporated herein by reference.

In general, the polyalkyl substituent on the polyalkyl alcohols of formula II and the resulting polyalkyl hydroxy and amino aromatic carbamates of the present invention will have an average molecular weight in the range of about 400 to 5,000, preferably about 500 to 3,000, more preferably about 600 to 2,000.

The polyalkyl substituent on the polyalkyl alcohols employed in the invention may be generally derived from polyolefins which are polymers or copolymers of mono-olefins, particularly 1-mono-olefins, such as ethylene, propylene, butylene, and the like. Preferably, the mono-olefin employed will have 2 to about 24 carbon atoms, and more preferably, about 3 to 12 carbon atoms. More preferred mono-olefins include propylene, butylene, particularly isobutylene, 1-octene and 1-decene. Polyolefins prepared from such mono-olefins include polypropylene, polybutene, especially polyisobutene, and the polyalphaolefins produced from 1-octene and 1-decene.

The preferred polyisobutenes used to prepare the presently employed polyalkyl alcohols are polyisobutenes which comprise at least about 20% of the more reactive methylvinylidene isomer, preferably at least 50% and more preferably at least 70%. Suitable polyisobutenes include those prepared using BF$_3$ catalysts. The preparation of such polyisobutenes in which the methylvinylidene isomer comprises a high percentage of the total composition is described in U.S. Pat. Nos. 4,152,499 and 4,605,808. Such polyisobutenes, known as "reactive" polyisobutenes, yield high molecular weight alcohols in which the hydroxyl group is at or near the end of the hydrocarbon chain.

Examples of suitable polyisobutenes having a high alkylvinylidene content include Ultravis 30, a polyisobutene having a molecular weight of about 1300 and a methylvinylidene content of about 74%, and Ultravis 10, a polyisobutene having a molecular weight of about 950 and a methylvinylidene content of about 76%, both available from British Petroleum.

The polyalkyl alcohols may be prepared from the corresponding olefins by conventional procedures. Such procedures include hydration of the double bond to give an alcohol. Suitable procedures for preparing such long-chain alcohols are described in I. T. Harrison and S. Harrison, *Compendium of Organic Synthetic Methods*, Wiley-Interscience, New York (1971), pp. 119–122, as well as in U.S. Pat. Nos. 5,055,607 and 4,859,210.

As indicated above, the polyalkyl hydroxy and amino aromatic carbamates of formula I may be prepared by first reacting a polyalkyl alcohol of formula II with phosgene to form a chloroformate ester.

The reaction of the polyalkyl alcohol of formula II and phosgene is usually carried out on an essentially equimolar basis, although excess phosgene can be used to improve the degree of reaction. Any excess phosgene can be stripped from the chloroformate ester product prior to reaction with the hydroxy or nitro aromatic amine. The reaction is typically carried out at room temperature, although temperatures in the range of about $-10°$ C. to $100°$ C., preferably about $0°$ C. to $50°$ C., may be employed. The reaction time will usually be in the range of about 0.5 to 48 hours. The reaction may be conducted in the presence or absence of an inert solvent, such as benzene, toluene, dichloromethane, and the like.

The resulting chloroformate ester of formula III is then reacted with a hydroxy or nitro aromatic amine of formula IV to form the polyalkyl hydroxy or nitro aromatic carbamates of formula V.

The reaction of chloroformate ester with the hydroxy or nitro aromatic amine will generally be carried out in the presence of an aprotic solvent, such as methyl cyanide, DMF, acetone, chloroform, toluene or THF, containing a base acceptor, such as sodium bicarbonate, sodium carbonate, triethylamine or pyridine. The reaction will generally be carried out at room temperature, although higher or lower temperatures in the range of about $-10°$ C. to $100°$ C. may be employed.

The mole ratio of the amine nitrogen to chloroformate ester will generally be in the range of about 1 to 10 moles of amine nitrogen per mole of chloroformate ester. The reaction time may vary from about 0.5 to about 48 hours. After reaction, the desired product may be isolated by conventional procedures, such as evaporation of the solvent, filtration and crystallization.

Although the polyalkyl hydroxy or amino aromatic carbamates of the present invention may be conveniently prepared by the chloroformylation reaction described above, utilizing phosgene, it is also known in the art that other methods of producing carbamates are available using other reactants. For example, the reaction of an isocyanate with an alcohol also produces a carbamate. Accordingly, it is within the skill of the art to use a selected isocyanate-substituted nitro or protected hydroxyaromatic compound to react directly with a polyalkyl alcohol to provide a carbamate within the scope of the present invention.

When necessary, protection of the aromatic hydroxyl groups on the hydroxyaromatic amines may be accomplished using well-known procedures. The choice of a suitable protecting group for a particular hydroxyaromatic amine will be apparent to those skilled in the art. Various protecting groups, and their introduction and removal, are described, for example, in T. W. Greene and P. G. M. Wuts, *Protective Groups in Organic Synthesis,* Second Edition, Wiley, New York, 1991, and references cited therein.

Deprotection of the aromatic hydroxyl group(s) can also be accomplished using conventional procedures. Appropriate conditions for this deprotection step will depend upon the protecting group(s) utilized in the synthesis and will be readily apparent to those skilled in the art. For example, benzyl protecting groups may be removed by hydrogenolysis under 1 to about 4 atmospheres of hydrogen in the presence of a catalyst, such as palladium on carbon. Typically, this deprotection reaction is conducted in an inert solvent, preferably a mixture of ethyl acetate and acetic acid, at a temperature of from about 0° C. to about 40° C. for about 1 to about 24 hours.

When synthesizing the polyalkyl aromatic carbamates of formula I having an amino group on the aromatic moiety (i.e., where X, $R_1$ and/or $R_2$ is an amino group), it is generally desirable to first prepare the corresponding nitro compound (i.e., where X, $R_1$ and/or $R_2$ is a nitro group) and then to reduce the nitro group to an amino group using conventional procedures. Aromatic nitro groups may be reduced to amino groups using a number of procedures that are well known in the art. For example, aromatic nitro groups may be reduced under catalytic hydrogenation conditions; or by using a reducing metal, such as zinc, tin, iron and the like, in the presence of an acid, such as dilute hydrochloric acid.

Generally, reduction of the nitro group by catalytic hydrogenation is preferred. Typically, this reaction is conducted using about 1 to 4 atmospheres of hydrogen and a platinum or palladium catalyst, such as palladium on carbon. The reaction is typically carried out at a temperature of about 0° C. to about 100° C. for about 1 to 24 hours in an inert solvent, such as ethanol, ethyl acetate and the like. Hydrogenation of aromatic nitro groups is discussed in further detail in, for example, P. N. Rylander, *Catalytic Hydrogenation in Organic Synthesis,* pp. 113–137, Academic Press (1979); and *Organic Synthesis,* Collective Vol. I, Second Edition, pp. 240–241, John Wiley & Sons, Inc. (1941); and references cited therein.

Fuel Compositions

The polyalkyl hydroxy and amino aromatic carbamates of the present invention are useful as additives in hydrocarbon fuels to prevent and control engine deposits, particularly intake valve deposits. The proper concentration of additive necessary to achieve the desired deposit control varies depending upon the type of fuel employed, the type of engine, and the presence of other fuel additives.

In general, the concentration of the polyalkyl aromatic carbamates of this invention in hydrocarbon fuel will range from about 50 to about 2500 parts per million (ppm) by weight, preferably from 75 to 1,000 ppm. When other deposit control additives are present, a lesser amount of the present additive may be used.

The polyalkyl aromatic carbamates of the present invention may be formulated as a concentrate using an inert stable oleophilic (i.e., dissolves in gasoline) organic solvent boiling in the range of about 150° F. to 400° F. (about 65° C. to 205° C.). Preferably, an aliphatic or an aromatic hydrocarbon solvent is used, such as benzene, toluene, xylene or higher-boiling aromatics or aromatic thinners. Aliphatic alcohols containing about 3 to 8 carbon atoms, such as isopropanol, isobutylcarbinol, n-butanol and the like, in combination with hydrocarbon solvents are also suitable for use with the present additives. In the concentrate, the amount of the additive will generally range from about 10 to about 70 weight percent, preferably 10 to 50 weight percent, more preferably from 20 to 40 weight percent.

In gasoline fuels, other fuel additives may be employed with the additives of the present invention, including, for example, oxygenates, such as t-butyl methyl ether, anti-knock agents, such as methylcyclopentadienyl manganese tricarbonyl, and other dispersants/detergents, such as hydrocarbyl amines, hydrocarbyl poly-(oxyalkylene) amines, or succinimides. Additionally, antioxidants, metal deactivators and demulsifiers may be present.

In diesel fuels, other well-known additives can be employed, such as pour point depressants, flow improvers, cetane improvers, and the like.

A fuel-soluble, nonvolatile carrier fluid or oil may also be used with the polyalkyl aromatic carbamates of this invention. The carrier fluid is a chemically inert hydrocarbon-soluble liquid vehicle which substantially increases the nonvolatile residue (NVR), or solvent-free liquid fraction of the fuel additive composition while not overwhelmingly contributing to octane requirement increase. The carrier fluid may be a natural or synthetic oil, such as mineral oil, refined petroleum oils, synthetic polyalkanes and alkenes, including hydrogenated and unhydrogenated polyalphaolefins, and synthetic polyoxyalkylene-derived oils, such as those described, for example, in U.S. Pat. No. 4,191,537 to Lewis, and polyesters, such as those described, for example, in U.S. Pat. Nos. 3,756,793 and 5,004,478 to Robinson and Vogel et al., respectively, and in European Patent Application Nos. 356,726 and 382,159, published Mar. 7, 1990 and Aug. 16, 1990, respectively.

These carrier fluids are believed to act as a carrier for the fuel additives of the present invention and to assist in removing and retarding deposits. The carrier fluid may also exhibit synergistic deposit control properties when used in combination with a polyalkyl aromatic carbamate compound of this invention.

The carrier fluids are typically employed in amounts ranging from about 100 to about 5000 ppm by weight of the hydrocarbon fuel, preferably from 400 to 3000 ppm of the fuel. Preferably, the ratio of carrier fluid to deposit control additive will range from about 0.5:1 to about 10:1, more preferably from 1:1 to 4:1, most preferably about 2:1.

When employed in a fuel concentrate, carrier fluids will generally be present in amounts ranging from about 20 to about 60 weight percent, preferably from 30 to 50 weight percent.

EXAMPLES

The following examples are presented to illustrate specific embodiments of the present invention and synthetic preparations thereof; and should not be interpreted as limitations upon the scope of the invention.

Example 1

Preparation of Polyisobutylchoroformate

Toluene (100 mL) and phosgene (130 mL of a 20 weight percent solution dissolved in toluene) were cooled to 0° C. under nitrogen. Polyisobutanol (50.0 grams, molecular weight average 984, prepared via hydroformylation of Amoco H-100 polyisobutene) dissolved in toluene (100 mL) was added dropwise. The cooling bath was removed and the reaction was stirred at room temperature for six hours. The solvent was removed in vacuo to yield 39.5 grams of the desired chloroformate as a light yellow oil.

Example 2

Preparation of Polyisobutyl-N-4-hydroxy-3-nitrophenylcarbamate

A solution of 39.5 grams of the product from Example 1 in chloroform (500 mL, filtered through activity 1 basic alumina) containing 4.54 grams of sodium bicarbonate and 8.32 grams of 4-hydroxy-3-nitroaniline was refluxed for sixteen hours under nitrogen. The mixture was cooled to room temperature, diluted with dichloromethane (1.2 L) and washed once with saturated aqueous sodium bicarbonate solution, twice with water and once with saturated aqueous sodium chloride. The organic layer was dried over anhydrous magnesium sulfate, filtered and concentrated in vacuo to yield 49.5 grams of a yellow brown oil. The oil was chromatographed on silica gel eluting with hexane followed by hexane/ethylacetate/ethanol (9:0.8:0.2) to yield 34.1 grams of the desired product as an orange oil. IR (neat) 1736, 1708 cm$^{-1}$. $^1$H NMR (CDCl$_3$) δ 10.4 (s, 1H), 8.2 (bs, 1H), 7.7 (d, 1H), 7.15 (d, 1H), 6.7 (bs, 1H), 4.2 (t, 2H), 0.6–1.8 (m, 137H).

Example 3

Preparation of Polyisobutyl-N-4-hydroxy-3-aminophenylcarbamate

A solution of 22.1 grams of the product from Example 2 in 200 mL of ethylacetate containing 3.0 grams of 10% palladium on charcoal was hydrogenolyzed at 35–40 psi for sixteen hours on a Parr low-pressure hydrogenator. Catalyst filtration and removal of the solvent in vacuo yielded 14.7 grams of the desired product as a brown oil. $^1$H NMR (CDCl$_3$) δ 6.9 (bs, 1H), 6.65 (d, 1H), 6.5 (d, 1H), 6.35 (bs, 1H), 4.15 (t, 2H), 4.0 (bs, 3H), 0.6–1.8 (m, 137H).

Example 4

Preparation of Polyisobutyl-N-4-hydroxyphenylcarbamate

A solution of 19.2 grams of the product prepared as in Example 1 in toluene (150 mL) containing 2.73 grams of 4-hydroxyaniline and 3.8 mL of triethylamine was refluxed for sixteen hours under nitrogen. The mixture was cooled to room temperature, diluted with hexane (450 mL) and washed once with water, once with saturated aqueous sodium bicarbonate solution, and once with saturated aqueous sodium chloride. The organic layer was dried over anhydrous magnesium sulfate, filtered and concentrated in vacuo to yield 27.1 grams of a brown oil. The oil was chromatographed on silica gel eluting with hexane followed by hexane/ethylacetate/ethanol (96:2:2) to yield 11.1 grams of the desired product as a yellow oil. $^1$H NMR (CDCl$_3$) δ 7.4 (d, 2H), 7.15 (d, 2H), 6.6 (bs, 1H), 4.2 (t, 2H), 0.6–1.8 (m, 137H).

Example 5

Single-Cylinder Engine Test

The test compounds were blended in gasoline and their deposit reducing capacity determined in an ASTM/CFR single-cylinder engine test.

A Waukesha CFR single-cylinder engine was used. Each run was carried out for 15 hours, at the end of which time the intake valve was removed, washed with hexane and weighed. The previously determined weight of the clean valve was subtracted from the weight of the value at the end of the run. The differences between the two weights is the weight of the deposit. A lesser amount of deposit indicates a superior additive. The operating conditions of the test were as follows: water jacket temperature 200° F.; vacuum of 12 in Hg, air-fuel ratio of 12, ignition spark timing of 22 40° BTC; engine speed is 1800 rpm; the crankcase oil is a commercial 30W oil.

The amount of carbonaceous deposit in milligrams on the intake valves is reported for each of the test compounds in Table I and Table II.

TABLE I

| Sample[1] | Intake Valve Deposit Weight (in milligrams) | | |
|---|---|---|---|
| | Run 1 | Run 2 | Average |
| Base Fuel | 253.4 | 235.5 | 244.5 |
| Example 2 | 30.1 | 23.2 | 26.7 |
| Example 3 | 9.9 | 7.2 | 8.6 |

[1]At 150 parts per million actives (ppma).

TABLE II

| Sample[1] | Intake Valve Deposit Weight (in milligrams) | | |
|---|---|---|---|
| | Run 1 | Run 2 | Average |
| Base Fuel | 302.6 | 300.4 | 301.5 |
| Example 4 | 5.7 | 4.5 | 5.1 |

[1]At 200 parts per million actives (ppma).

The base fuel employed in the above single-cylinder engine tests was a regular octane unleaded gasoline containing no fuel detergent. The test compounds were admixed with the base fuel to give concentrations of 150 and 200 ppma (parts per million actives), as indicated in the tables.

The data in Table I and Table II illustrates the significant reduction in intake valve deposits provided by the polyalkyl aromatic carbamates of the present invention (Examples 2, 3 and 4) compared to the base fuel.

What is claimed is:

1. A compound of the formula:

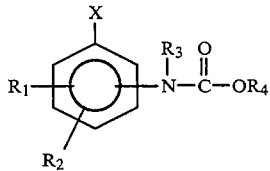

or a fuel-soluble salt thereof; wherein
X is hydroxy or amino;
R$_1$ and R$_2$ are independently hydrogen, hydroxy, lower alkyl having 1 to 6 carbon atoms, lower alkoxy having 1 to 6 carbon atoms, nitro, amino, N-alkylamino wherein the alkyl group contains 1 to 6 carbon atoms, or N,N-dialkylamino wherein each alkyl group independently contains 1 to 6 carbon atoms;

$R_3$ is hydrogen or lower alkyl having 1 to 6 carbon atoms; and $R_4$ is a polyalkyl group having an average molecular weight in the range of about 400 to 5,000.

2. The compound according to claim 1, wherein $R_1$ and $R_2$ are independently hydrogen, hydroxy, lower alkyl of 1 to 4 carbon atoms, nitro or amino; and X is hydroxy.

3. The compound according to claim 2, wherein $R_9$ and $R_2$ are independently hydrogen, hydroxy or amino.

4. The compound according to claim 3, wherein $R_1$ and $R_2$ are independently hydrogen or amino.

5. The compound according to claim 4, wherein $R_1$ is amino and $R_2$ is hydrogen.

6. The compound according to claim 4, wherein $R_1$ and $R_2$ are both amino.

7. The compound according to claim 1, wherein $R_3$ is hydrogen or lower alkyl of 1 to 4 carbon atoms.

8. The compound according to claim 1, wherein $R_4$ is a polyalkyl group having an average molecular weight in the range of about 500 to 3,000.

9. The compound according to claim 8, wherein $R_4$ has an average molecular weight in the range of about 600 to 2,000.

10. The compound according to claim 1, wherein $R_4$ is a polyalkyl group derived from polypropylene, polybutene, or polyalphaolefin oligomers of 1-octene or 1-decene.

11. The compound according to claim 10, wherein $R_4$ is derived from polyisobutene.

12. The compound according to claim 11, wherein the polyisobutene contains at least about 20% of a methylvinylidene isomer.

13. A fuel composition comprising a major amount of hydrocarbons boiling in the gasoline or diesel range and an effective detergent amount of a compound of the formula:

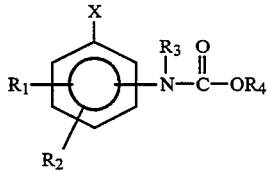

or a fuel-soluble salt thereof; wherein

X is hydroxy or amino; $R_1$ and $R_2$ are independently hydrogen, hydroxy, lower alkyl having 1 to 6 carbon atoms, lower alkoxy having 1 to 6 carbon atoms, nitro, amino, N-alkylamino wherein the alkyl group contains 1 to 6 carbon atoms, or N,N-dialkylamino wherein each alkyl group independently contains 1 to 6 carbon atoms;

$R_3$ is hydrogen or lower alkyl having 1 to 6 carbon atoms; and $R_4$ is a polyalkyl group having an average molecular weight in the range of about 400 to 5,000.

14. The fuel composition according to claim 13, wherein $R_1$ and $R_2$ are independently hydrogen, hydroxy, lower alkyl of 1 to 4 carbon atoms, nitro or amino; and X is hydroxy.

15. The fuel composition according to claim 14, wherein $R_1$ and $R_2$ are independently hydrogen, hydroxy or amino.

16. The fuel composition according to claim 15, wherein $R_1$ and $R_2$ are independently hydrogen or amino.

17. The fuel composition according to claim 16, wherein $R_1$ is amino and $R_2$ is hydrogen.

18. The fuel composition according to claim 16, wherein $R_1$ and $R_2$ are both amino.

19. The fuel composition according to claim 13, wherein $R_3$ is hydrogen or lower alkyl of 1 to 4 carbon atoms.

20. The fuel composition according to claim 13, wherein $R_4$ is a polyalkyl group having an average molecular weight in the range of about 500 to 3,000.

21. The fuel composition according to claim 20, wherein $R_4$ has an average molecular weight in the range of about 600 to 2,000.

22. The fuel composition according to claim 13, wherein $R_4$ is a polyalkyl group derived from polypropylene, polybutene, or polyalphaolefin oligomers of 1-octene or 1-decene.

23. The fuel composition according to claim 22, wherein $R_4$ is derived from polyisobutene.

24. The fuel composition according to claim 23, wherein the polyisobutene contains at least about 20% of a methylvinylidene isomer.

25. The fuel composition according to claim 13, wherein said composition contains about 50 to about 2500 parts per million by weight of said compound.

26. A fuel concentrate comprising an inert stable oleophilic organic solvent boiling in the range of from about 150° F. to 400° F. and from about 10 to about 70 weight percent of a compound of the formula:

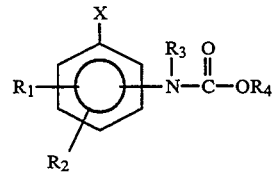

or a fuel-soluble salt thereof; wherein

X is hydroxy or amino;

$R_1$ and $R_2$ are independently hydrogen, hydroxy, lower alkyl having 1 to 6 carbon atoms, lower alkoxy having 1 to 6 carbon atoms, nitro, amino, N-alkylamino wherein the alkyl group contains 1 to 6 carbon atoms, or N,N-dialkylamino wherein each alkyl group independently contains 1 to 6 carbon atoms;

$R_3$ is hydrogen or lower alkyl having 1 to 6 carbon atoms; and $R_4$ is a polyalkyl group having an average molecular weight in the range of about 400 to 5,000.

27. The fuel concentrate according to claim 26, wherein $R_1$ and $R_2$ are independently hydrogen, hydroxy, lower alkyl of 1 to 4 carbon atoms, nitro or amino; and X is hydroxy.

28. The fuel concentrate according to claim 27, wherein $R_1$ and $R_2$ are independently hydrogen, hydroxy or amino.

29. The fuel concentrate according to claim 28, wherein $R_1$ and $R_2$ are independently hydrogen or amino.

30. The fuel concentrate according to claim 29, wherein $R_1$ is amino and $R_2$ is hydrogen.

31. The fuel concentrate according to claim 29, wherein $R_1$ and $R_2$ are both amino.

32. The fuel concentrate according to claim 26, wherein $R_3$ is hydrogen or lower alkyl of 1 to 4 carbon atoms.

33. The fuel concentrate according to claim 26, wherein $R_4$ is a polyalkyl group having an average molecular weight in the range of about 500 to 3,000.

34. The fuel concentrate according to claim 33, wherein $R_4$ has an average molecular weight in the range of about 600 to 2,000.

35. The fuel concentrate according to claim 26, wherein $R_4$ is a polyalkyl group derived from polypropylene, polybutene, or polyalphaolefin oligomers of 1-octene or 1-decene.

36. The fuel concentrate according to claim 35, wherein $R_4$ is derived from polyisobutene.

37. The fuel concentrate according to claim 36, wherein the polyisobutene contains at least about 20% of a methylvinylidene isomer.

* * * * *